United States Patent [19]

Stauffer

[11] 4,309,603
[45] Jan. 5, 1982

[54] AUTO FOCUS SYSTEM

[75] Inventor: Norman L. Stauffer, Englewood, Colo.

[73] Assignee: Honeywell Inc., Minneapolis, Minn.

[21] Appl. No.: 85,821

[22] Filed: Oct. 17, 1979

[51] Int. Cl.³ ............................................... G01J 1/36
[52] U.S. Cl. ..................................... 250/204; 354/25
[58] Field of Search .................. 250/201, 204, 209; 354/25; 356/1, 4

[56] References Cited

U.S. PATENT DOCUMENTS

| | | | |
|---|---|---|---|
| 3,875,401 | 4/1975 | Stauffer | 250/201 |
| 3,937,950 | 2/1976 | Hosoe et al. | 354/25 |
| 4,103,152 | 7/1978 | Stauffer | 250/204 |

*Primary Examiner*—David C. Nelms
*Attorney, Agent, or Firm*—Charles J. Ungemach

[57] ABSTRACT

Range finding equipment for use with optical systems and particularly low cost cameras to provide for proper focus of a remote object. A small number of radiation detectors are positioned to receive radiation in first and second patterns from the object to be focused upon through an auxiliary lens. The outputs of the detectors are processed to produce a resultant signal which is indicative of the position for proper focus. The auxiliary lens is coupled to the taking lens of the camera and means are provided for moving both lenses in accordance with the resultant signal so that the taking lens is in a proper focus position. The detectors may be photo diodes to facilitate the use of log signals to thereby compensate for differences in intensity of the scene being viewed.

25 Claims, 8 Drawing Figures

4,309,603

AUTO FOCUS SYSTEM

BACKGROUND OF THE INVENTION

In a copending application of Norman L. Stauffer, Ser. No. 912,688, filed June 5, 1978, now U.S. Pat. No. 4,185,191, issued Jan. 22, 1980 a range determination system is shown which is useable in a through-the-lens camera for positioning the taking lens at a desired correct focus position with respect to a remote object within the field of view. That system utilizes a plurality of small detectors such as charge coupled devices (CCD) or charge injection devices (CID) mounted in an array to receive radiation from the scene being viewed. The detectors are arranged in pairs with each pair being mounted behind a small lenslet so that each pair receives a view of the exit pupil of the taking lens but one of the detectors in each pair receives radiation primarily from a first portion of the taking lens while the other of the detectors in each pair receives radiation primarily from a different portion of the taking lens. The result is to create two similar curves indicative of the radiation distribution pattern from the scene being viewed. At the proper focus position, the two curves coincide, but as the object changes position with respect to the camera, the two curves move with respect to each other to indicate an out-of-focus situation. The two curves move with respect to each other in a first direction when the object moves closer to the camera than the desired focus position and move in an opposite direction with respect to each other as the object moves further from the camera than the desired focus position. By determining the direction of movement of the two curves with respect to each other, it is therefore possible to determine the direction that the taking lens has to be moved to achieve the desired focus position.

In a copending application of Norman L. Stauffer and Dennis J. Wilwerding, Ser. No. 016,595, filed Mar. 1, 1979, now U.S. Pat. No. 4,249,073 an improvement on the above-mentioned copending application Ser. No. 912,688 is disclosed wherein a method and apparatus for determining the direction in which the two similar curves should be moved in order to produce the coincidence indicative of a proper focus position. In that application, a value indicative of the slope of the curves at predetermined points is obtained and this value is multiplied by the difference in the value of the output of the detectors at such points. The product is summed over a predetermined range. The summation value is substantially 0 when the two curves coincide but will have a characteristic such as plus or minus to indicate the direction the taking lens must be moved when the two curves do not coincide.

In a copending application of Dennis J. Wilwerding and James D. Joseph, Ser. No. 058,964, filed July 20, 1979, now U.S. Pat. No. 4,250,376 an improvement on the above-mentioned copending applications is disclosed wherein the need for taking the product of the value indicative of the slope of the curves and the value indicative of the difference is eliminated and in lieu thereof a first signal representative of the absolute magnitude of the difference between the outputs of the two detectors, one from each of the curves, is produced and a second signal representative of the absolute magnitude of the difference between the outputs of two other detectors, one from each of the curves, is also produced. The two absolute magnitude signals are differenced and the result is summed over a predetermined range. The resultant summed signal is substantially 0 when the two curves coincide, will have a first characteristic such as a negative sign when the two curves are displaced in the first direction and a second characteristic such as a positive sign when the two curves are displaced in the opposite direction so as to provide the desired direction signal.

In a copending application of Norman L. Stauffer and Dennis J. Wilwerding, Ser. No. 074,845, filed Sept. 13, 1979, now U.S. Pat. No. 4,254,330 an improvement on the above-mentioned systems is disclosed which operates to prevent a false 0 cross-over situation that can occur in highly repetitive patterns and which produces a summation signal that responds to the low frequency variations in the pattern.

All of the above copending applications involve circuitry for use in highly accurate auto focus systems for use on fairly expensive cameras such as single lens reflex types and accordingly the relatively high cost of the auto focus systems is not of serious consequence. There is a need, however, for a low cost auto focus system that may be useable in less expensive cameras and still retain most of the advantages obtained from the above-mentioned copending applications.

SUMMARY OF THE INVENTION

The apparatus of the present invention utilizes the basic principles found in the above copending applications but whereas the prior art systems utilize a costly large number of detector pairs of the CCD or CID variety and corresponding complex circuitry for determining the proper focus direction, the present invention utilizes a small number of detectors (in the preferred embodiment herein disclosed only four detectors are used) and in lieu of utilizing CCD or CID arrays, the present invention utilizes photo diodes which have certain advantages hereinafter discussed. The resulting detector array is easier to fabricate and involves simplified electronics to produce a system which, although somewhat less accurate than the prior art systems, is of considerably reduced cost and is thus practical for use with low cost cameras. The use of photo diodes in lieu of CCD or CID detectors is advantageous since it becomes practical to use log signals as outputs from the system and log signals are useful since they automatically compensate for different light levels in the scene being viewed.

In the present invention, an additional lens, hereinafter referred to as the focus lens, is utilized in combination with a pair of lenslets and four photo diode detectors to produce the auto focus signal necessary for adjusting the position of the taking lens of the camera at the desired focus position. The focus lens is mechanically connected to the taking lens and moves along a parallel axis therewith. As was the case in the above-referred to copending applications, the focus lens and the lenslets produce a radiation pattern to which the two pairs of photo diodes are exposed. When the focus lens and the taking lens are on a first side of the proper focus position, the system output will have a first characteristic, for example, a positive value; at the proper focus position, the output will have a second characteristic, for example, a zero value; and on the other side of the proper focus position, the system output will have a third characteristic, for example, a negative value. A novel lens moving structure is provided which moves the focus lens and the taking lens to the proper focus position and holds them there while the film is being exposed.

In the prior art, the outputs of individual detectors in each pair were compared according to the equation:

$$V = \sum_{n=1}^{N-1} |a_n - b_{n+1}| - |a_{n+1} - b_n|$$

where V is the resultant output, N is the total number of detector pairs, $a_n$ and $b_n$ are the outputs of the detectors in a first of the pairs and $a_{n+1}$ and $b_{n+1}$ are the outputs of the detectors in a second of the pairs. A summation curve of the detector pairs is obtained from the above equation. This summation curve varies from a plus to a minus value and through a zero cross-over point indicative of the proper focus position. In the present invention, the outputs of two detector pairs are compared according to the equation:

$$V = |\log a_1 - \log b_2| - |\log a_2 - \log b_1| \quad (1)$$

or, to simplify $$V = \left| \log \frac{a_1}{b_2} \right| - \left| \log \frac{a_2}{b_1} \right| \quad (2)$$

where V is the resultant output and $a_1$, $b_1$, $a_2$ and $b_2$ are the respective outputs of the two pairs of detectors used. Equation 2 operates to produce a summation curve that normally is positive on one side of the proper focus position and negative on the other side of the proper focus position with the 0 cross-over representing the position of best focus.

In the present invention, the focus lens and the taking lens are preferably initially set at an "infinity" position and the camera operator starts the auto focus action by depressing the shutter or picture-taking button. The first portion of movement of the shutter button operates to supply power to the auto focus circuitry and to start simultaneous motion of the camera taking lens and the focus lens from the infinity position towards a "near" position. As the auto focus electronics determine the 0 cross-over position, the motion of the two lenses is terminated and thereafter continued motion of the shutter button has no effect until it contacts a shutter release mechanism. The operator may then compose the picture if he desires to do so. Further pressure on the shutter button thereafter operates to activate the shutter release mechanism and cause exposure of the film in the camera. After taking the picture, the shutter button is released and the two lenses return to their normal infinity position with the auto focus electronics being deactivated.

DETAILED DESCRIPTION OF THE PREFERRED EMBODIMENT

Figure 1:
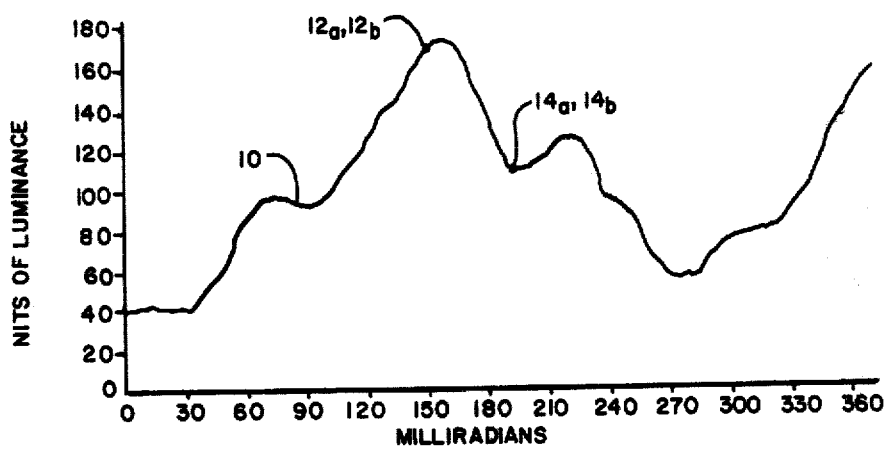
FIG. 1 shows a distribution pattern of radiation as might be produced from the scene being viewed in both the prior art systems and in the present invention when the focus lens is at the proper focus position and shows one possible position of the two detector pairs in the pattern.

In FIG. 1, a curve 10 is shown representing the pattern of light intensity that might be produced by the focus lens and lenslets from the scene being viewed or more particularly the outputs of detectors that might be placed in the pattern when the subject is at the proper focus position. In FIG. 1, the ordinate axis of curve 10 is shown as nits of luminance and the curve is seen to extend from a low about 40 nits to a high of about 180 nits while the abscissa axis is shown as milliradians across the image being viewed and the curve is seen to extend from 0 to approximately 360 milliradians. The amount of luminance will, of course, vary with the lighting and composition of the scene being viewed and the size of the scene image at the image plane will vary with the focal length of the lens.

In FIG. 1, the situation is as it would exist when the lens is in the proper focus so that both of the detectors in each of the pairs is receiving the same amount of radiation and thus producing the same magnitude output signal.

In the prior art, a plurality of detector pairs (usually about 32) of the CCD or CID variety are placed between two arbitrary points on the curve somewhere in the middle thereof. In the present invention, a small number of detector pairs, for example 2, are utilized and as seen in FIG. 1, are placed at about 150 and 200 milliradians respectively as identified by reference numerals 12a, 12b, 14a and 14b.

Figure 2:
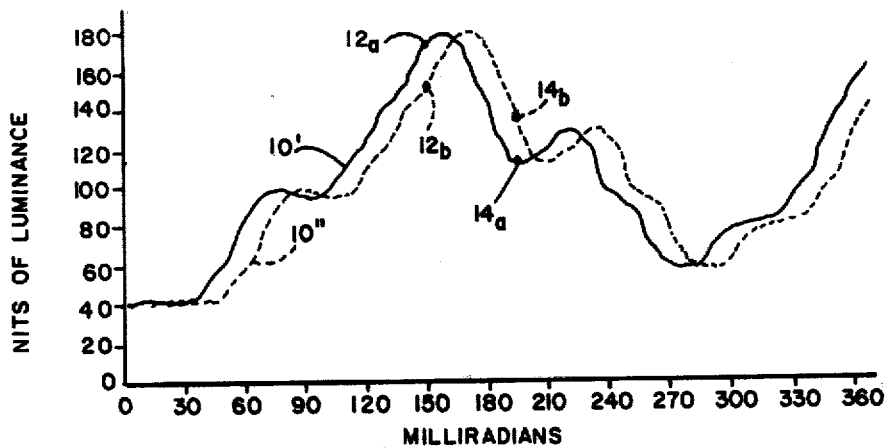
FIG. 2 shows the radiation distribution pattern of FIG. 1 in two curves indicative of an out-of-focus condition and the position of the four detectors in the pattern.

FIG. 2 shows the radiation distribution pattern of FIG. 1 in an out-of-focus condition and it can be seen in FIG. 2 that curve 10 of FIG. 1 has now become two curves, curve 10' shown as a solid line, and curve 10", shown as a dashed line. In FIG. 2, the detector pairs are now separated and are again identified by reference numerals 12a, 12b, 14a and 14b. It is seen that the outputs of the detectors in each pair are no longer the same since the dashed line 10" is to the right of the solid line 10' representing the condition when the object is on a first side of the proper focus position. If the object were to be on the opposite side of the proper focus position, the dashed line curve 10" would be to the left of the solid line curve 10' and the outputs of detectors 12a, 12b, 14a and 14b would still be different but in an opposite sense. The outputs of these detectors are utilized in circuitry such as will be explained in connection with FIG. 6 to obtain a proper focus signal.

Figure 3:
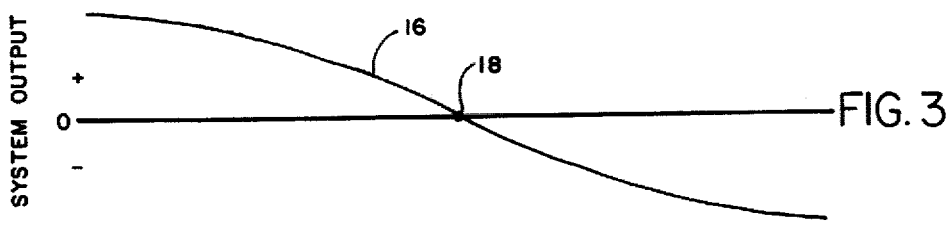
FIG. 3 shows the resultant output curve that might be produced by the auto focus electronics when receiving the outputs of the detectors shown in FIG. 2 and the patterns are displaced on both sides of the proper focus position.
Figure 6:
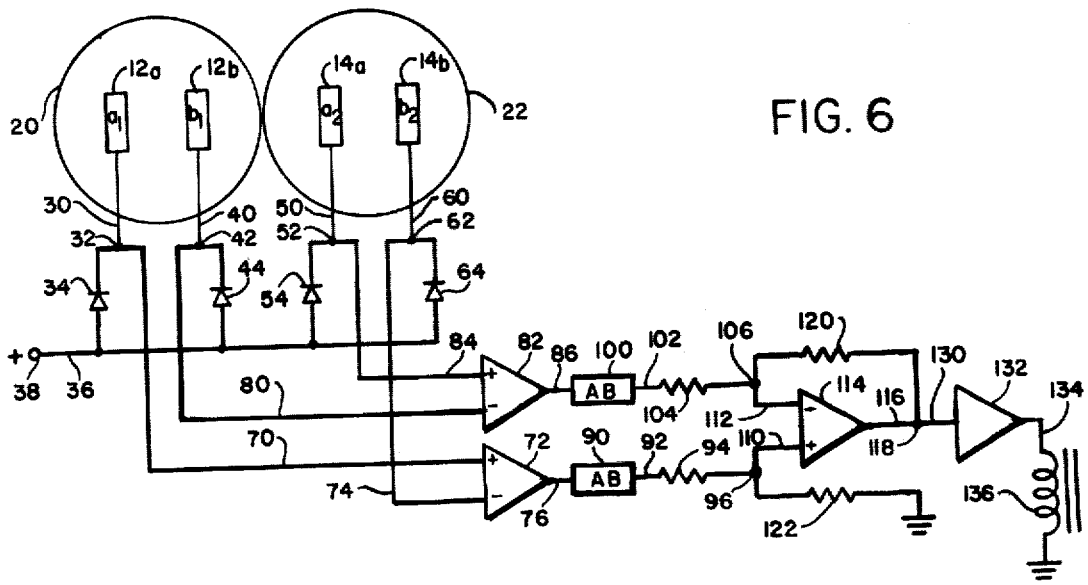
FIG. 6 shows the electronics of the auto focus system of the present invention.

FIG. 3 shows a graph of the output obtained from detectors 12a, 12b, 14a and 14b when they are processed in accordance with the equation (2) $|\log a_1/a_2| - |\log a_2/b_1|$ and the focus lens and taking lens are moved from an infinity position at the left of FIG. 3 to a near position at the right of FIG. 3. In FIG. 3, a curve 16 is shown extending from a high or plus value on the left or infinity side of FIG. 3 through a 0 cross-over point 18 near the center of FIG. 3 and extending to a low or negative portion on the right or near side of FIG. 3. Curve 16 represents the output of the circuitry of FIG. 6 plotted against the displacement of the patterns of FIG. 2. More specifically, when the focus lens and the taking lens are at a considerable distance from the proper focus condition on the infinity side, then the two patterns of FIG. 2 will be considerably separate from one another and the output of the system of FIG. 6 will appear well into the positive region on the left side of FIG. 3. As the focus lens and taking lens move closer to the proper focus position, the two patterns of FIG. 2 will come closer together until the point is reached when the lenses are at the proper focus position at which time the two curves of FIG. 2 will be coincident and the output of the circuitry of FIG. 6 will be 0 such as is shown at point 18. As the focus lens and taking lens move away from the in-focus position more and more towards the near position, the output of the circuitry of FIG. 6 will follow curve 16 to the right and become more and more negative as the patterns of FIG. 2 move further and further apart in the opposite sense. Accordingly, the circuitry of FIG. 6 operates to detect when the curve 16 of FIG. 3 reaches 0 cross-over point 18 for purposes of controlling the position of the camera lenses.

Referring now to FIG. 6, detector 12a is shown as a box labelled $a_1$, detector 12b is shown as a box labelled $b_1$, detector 14a is shown as a box labelled $a_2$ and detector 14b is shown as a box labelled $b_2$. Detectors 12a, 12b, 14a and 14b are preferrably photo diodes which produce outputs indicative of the amount of radiation received thereby. The detector pair consisting of detectors 12a and 12b are located behind a first lenslet which produces an image of the exit pupil of the focus lens as is shown by a circle 20 surrounding both detectors. In like manner, detectors 14a and 14b are located behind a lenslet which produces an image of the exit pupil of the focus lens as is shown as a circle 22. In a proper focus condition, the images 20 and 22 will expose both detectors $a_1$ and $b_1$ to the same amount of radiation and will expose both detectors $a_2$ and $b_2$ to the same amount of radiation. In an out-of-focus condition, the images 20 and 22 will change in a manner which depends upon the direction that the object to be focused upon has moved from the proper focus position and the detectors in each pair will receive different amounts of radiation.

The output of detector 12a indicative of the amount of radiation it receives, is presented on a line 30 to a junction point 32. Junction point 32 is connected to one side of a logging diode 34 which has its other side connected to a line 36 connected to a positive source of potential such as at point 38. The purpose of logging diode 34 is to change the signal which appears at terminal 32 to a log signal representative of the amount of radiation received by detector 12a. Thus the signal at point 32 will be a magnitude which varies with log $a_1$.

In similar fashion, detector 12b has an output on line 40 which is connected to a junction point 42. Junction point 42 is shown connected to one side of a logging diode 44 which has its other side connected to line 36 and the positive source of potential at point 38. Logging diode 34 changes the signal at junction point 42 to one representative of log $b_1$.

Detector 14a has an output on a line 50 connected to a junction point 52. Junction point 52 is connected to one side of a logging diode 54 which has its other side connected to line 36 and the source of positive potential 38. Diode 54 operates to change the signal at junction point 52 to one representative of log $a_2$.

The output of detector 14b appears on a line 60 which is shown connected to a junction point 62. Junction point 62 is connected to one side of a logging diode 64 which has its other side connected to line 36 and the source of positive potential at 38. Logging diode 64 operates to change the signal at point 62 to one representative of log $b_2$.

The signal log $a_1$ at junction point 32 is connected by a line 70 to the positive terminal of a difference amplifier 72 while the signal at junction point 62 representative of log $b_2$ is connected by a line 74 to the negative terminal of difference amplifier 72. The output of difference amplifier 72 appears on a line 76 and the signal on this line will be representative of log $a_1$ − log $b_2$.

In similar fashion, junction point 42, representative of log $b_1$, is connected by a line 80 to the negative terminal of a difference amplifier 82. Junction point 52, having a signal thereon representative of log $a_2$, is connected by a line 84 to the positive terminal of difference amplifier 82. The output of difference amplifier 82, appearing on a line 86, will therefore be representative of log $a_2$ − log $b_1$.

The output of difference amplifier 72 on line 76 is connected to an absolute value circuit 90 having an output on line 92 connected through a resistor 94 to a junction point 96. The operation of absolute value circuit 90 is to change the signal on line 76 to an absolute value so that the signal appearing at terminal 96 is representative of $|\log a_1 - \log b_2|$ or, to simplify, $|\log a_1/b_2|$. In like manner, the output of difference amplifier 82 on line 86 is connected to an absolute value circuit 100 having an output on a line 102 connected through a resistor 104 to a junction point 106. The operation of absolute value circuit 100 is to change the signal on line 86 to one of an absolute value and accordingly, the signal on terminal 106 is representative of $|\log a_2 - \log b_1|$ or, to simplify, $|\log a_2/b_1|$.

Junction points 96 and 106 are connected by a pair of conductors 110 and 112 respectively to the inputs of a difference amplifier 114 having an output on line 116 connected to a junction point 118. Junction point 118 is connected to junction point 106 through a resistor 120 while junction point 96 is connected through a resistor 122 to signal ground. The operation of difference amplifier 114 is to subtract the signals on junction points 96 and 106 so that the signal appearing on junction point 118 is indicative of $|\log a_1/b_2| - |\log a_2/b_1|$ which is the desired function of equation (2) used for the operation of the present invention. This signal on junction point 118 is connected by a line 130 to a power amplifier 132 having an output on line 134 connected through a solenoid 136 to signal ground.

The signal on junction point 118, as well as the output of power amplifier 132 on line 134, will be a signal like that shown in FIG. 3 which has a plus sign when the focus lens and the taking lens are on the infinite side of the desired focus position, a negative sign when the lenses are on the near side of the desired focus position and a value of 0 when the lenses are at the proper focus position. When the signal on line 134 is positive, solenoid 136 will be activated to a first position but when the signal reaches 0 and crosses over into the negative values, solenoid 136 will be deactivated to a second position for purposes of stopping the lenses as will be explained hereinafter.

Figure 7:
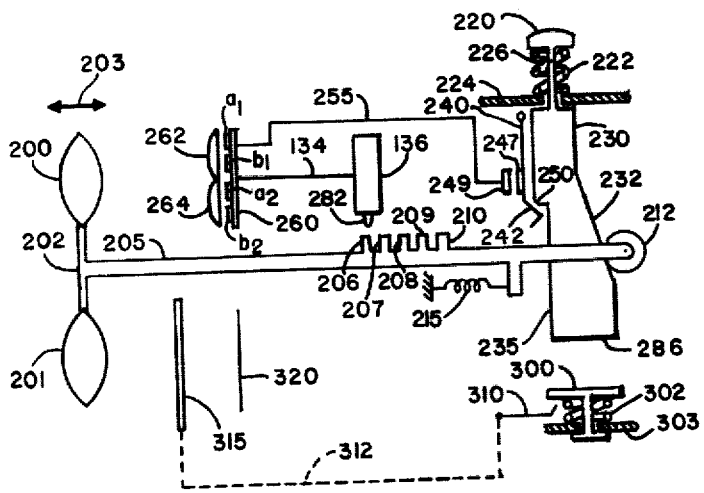
FIG. 7 shows one preferred layout arrangement for the taking and focus lenses, and the lenslets and detectors of the present invention along with their connections to the shutter button and shutter control mechanism of a camera.

Referring now to FIG. 7, a pair of lenses 200 and 201 are shown mechanically connected together by a member 202. Lens 201 may be the taking lens of the camera and lens 200 the auxillary or focus lens used for obtaining the auto focus signal. Mechanical connection 202 is shown connected to an elongated member 205 which is shown having a plurality of stops or abutments 206, 207, 208, 209 and 210 mounted thereon. Stops 206-210 are used to provide a means for positioning lenses 200 and 201 in the proper focus position as will be described hereinafter. Elongated member 205 carries a cam follower 212 at the right end thereof and is biased to the left in FIG. 10 by a spring 215.

A camera activation or shutter button 220 is shown in FIG. 10 biased upwardly by a light spring 222 bearing against a surface 224 which may be part of the camera housing. Shutter button 220 is connected by a shaft 226 to a cam member 230 having an inclined surface 232 on the lower portion thereof which bears against cam follower 212. Cam member 230 has an indented portion 235 on the opposite side from inclined surface 232 for purposes to be explained.

A switch arm 240 connected to a source of positive potential (not shown), has a V-shaped extension 242 on the lower end thereof which is shown in FIG. 10 lying within the indented portion 235 of cam member 230. Switch arm 240 carries a switch contact 247 which is operable to cooperate with a switch contact 249 whenever switch arm 240 is moved to the left in FIG. 10. As shown with V-shaped portion 242 within the indented portion 235 of cam member 230, the switch comprised of contacts 247 and 249 are in an opened condition.

Upon depressing the shutter button 220, cam member 230 moves downward against the force of light spring 222 and the cam follower 212 under the force of spring 215, operates to move elongated member 205 and lenses 200 and 201 to the left in FIG. 10 from an infinity position towards a near position. When this occurs, the downward motion of cam 230 causes an abutment 250 at the upper end of indented portion 235 of cam member 230 to bear against the V-shaped portion 242 of switch arm 240 thereby bringing switch contact 247 into contact with switch contact 249 and thereby applying the positive potential from switch arm 240 to switch contact 249. A line 255 is shown connected from switch contact 249 to a circuit chip 260 in FIG. 10 which contains the circuit components shown in FIG. 6 thereon. More specifically, line 255 of FIG. 10 is connected to junction point 38 in FIG. 6 and is operable to apply the positive potential to line 36 of FIG. 6.

The detectors $a_1$, $a_2$, $b_1$ and $b_2$ of FIG. 6 are shown on the surface of chip 260 in FIG. 7 mounted in pairs just behind a pair of lenslets 262 and 264 respectively. By this arrangement, radiation from the scene being viewed passes through auxillary or focus lens 200 and lenslets 262 and 264 to produce the radiation patterns explained in connection with FIGS. 1 and 2 to the detectors $a_1$, $a_2$, $b_1$ and $b_2$ and thus create the desired signals for use in the circuitry of FIG. 6. The circuitry of FIG. 6 is part of the circuit chip 260 in FIG. 10 and the output that appears on line 134 of FIG. 6 is shown on FIG. 10 as lead 134 from circuit chip 260 to solenoid 136 whose operation was explained in connection with FIG. 6. Solenoid 136 has a plunger 282 which extends proximate the abutments or stops 206-210 and which moves upwardly or downwardly in FIG. 10 depending upon the condition of energization of solenoid 136. More specifically, as long as the signal on line 134 of FIG. 6 is positive, solenoid 136 will be activated and plunger 282 will be in an upward or retracted position away from abutment members 206-210. When the signal reaches the 0 cross-over point and during the negative portion of the curve shown in FIG. 3, the output on line 134 of FIG. 6 will be 0 or negative and solenoid 136 is will be deactivated allowing plunger 282 to move down into contact with one of the abutment members 206-210. This action stops the motion of elongated member 205 at the zero cross-over point and lenses 200 and 201 will be stopped in their travel towards the left at the proper focus position.

With further movement of cam member 230 downward under the action of the operator's pressing of the shutter button 220, cam follower 212 will no longer stay in contact with cam surface 232 since solenoid plunger 282 is restraining motion of elongated member 205 and lenses 200 and 201. As the operator continues to press down on shutter button 220, an end abutment 286 of cam member 230 will reach an activation member 300 which is shown biased upwardly in FIG. 10 by a relatively strong spring 302 bearing against a camera surface 303. The operator will feel the resistance to further motion presented by the relatively strong spring 302 and accordingly he may, at this time, move the camera around to compose his picture before the film is exposed. During this time, lenses 200 and 201 will remain in the proper focus position since elongated member 205 is being held in place by plunger 282 of solenoid 136. The increased resistance to motion also informs the operator that the camera taking lens is at a proper focus position so that he may continue or discontinue the picture taking operation. If he wishes to abort the picture, he may release the shutter activation button 220 which will allow cam member 230 to move upwardly until the V-shaped member on switch arm 240 moves into the indented portion 235 of cam 230 thereby deactivating the system, removing plunger 282 from contact with one of the abutments 206-210 and allowing spring member 215 to urge elongated member 205 and lenses 200 and 201 back to their infinity position. On the other hand, if the operator wishes to continue the picture taking sequence, he continues to push downwardly at which time the force of his pressure overcomes the resistance of spring 302 and allows activation member 300 to contact a shutter release arm 310 of the camera which operates through a mechanical connection shown as dashed line 312 to move a shutter 315 thereby allowing radiation from the scene being viewed to pass through the taking lens 201 of the camera and to strike the film 320 for purposes of exposing the picture. The shutter release mechanism 310, 312 and 315 may be of the standard kind normally found in cameras.

After the picture has been taken, release of the shutter button 220 again allows the cam 230 to move upwardly thereby removing power from the system as the V-shaped portion 242 of switch arm 240 moves into the indented portion 235 of cam 230 and elongated member 205 along with lenses 200 and 201 again assumes the "infinity" position in readiness for the next picture.

If desired, instead of utilizing stop members 206-210, a magnetic member may be mounted on elongated member 205 which will cause the stopping of lenses 200 and 201 when solenoid 136 is activated at the 0 crossover position. Other alternate ways of stopping elongated member 205 will occur to those skilled in the art.

In the preferred embodiment, lenses 200 and 201 are shown directly connected together and each moves the same amount upon motion of elongated member 205. In this case, the focal length of the two lenses should be the same so that the effect of the focus of lens 200 with respect to the auto focus detectors $a_1$, $a_2$, $b_1$ and $b_2$ is the same as the lens 201 with respect to film 320. If desired, a proportioning connection can be made between lens 201 and 200 such as a gear train so that different amounts of motion occur between lenses 200 and 201 to obtain proper focus and different focal length lenses would then be employed.

Figure 5:
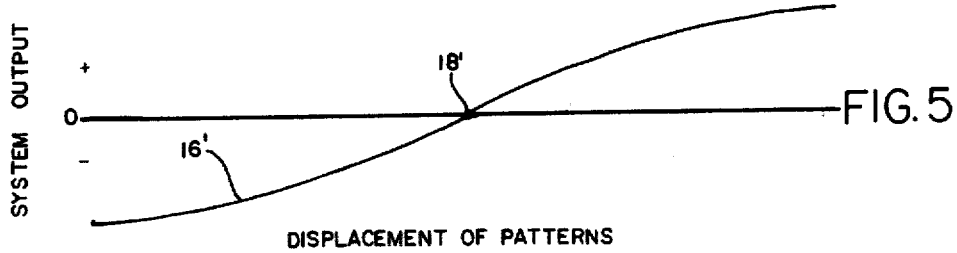
FIG. 5 shows the resultant output that might be produced by the auto focus electronics when receiving the outputs of the detectors shown in FIG. 4 and the patterns are displaced on both sides of the proper focus position.
Figure 4:
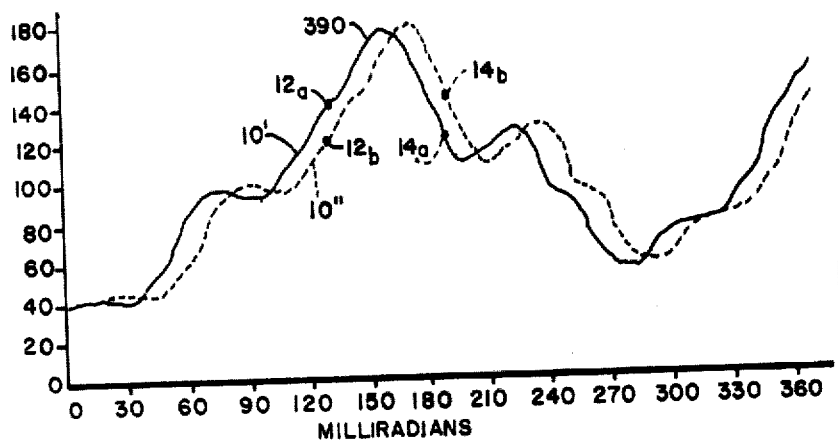
FIG. 4 shows the distribution pattern of FIG. 2 with the detectors located at a different position in the pattern.
Figure 8:
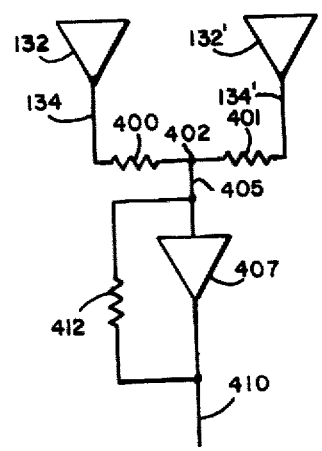
FIG. 8 shows a summing circuit for use with two systems like that of FIG. 6.

The system described above operates satisfactorily to position the taking lens of a camera to the desired focus position in a majority of the cases but with the utilization of a small number of detectors, a difficulty may arise which causes the curve of FIG. 3 to reverse sign and extend from a negative value at the infinity position to a positive value at the near position. It is believed that this occurs when the detectors happen to straddle a peak of the distribution pattern. For example, FIG. 4 shows a graph like that of FIG. 2 but wherein a peak 390 of curve 10' happens to fall about midway between the position of the detectors. It is seen that 12a and 14a in FIG. 4 are on opposite sides of the peak 390 in approximately equal amounts. While the phenomena has not been thoroughly investigated, it appears that when this occurs, equation (2), under these circumstances, will produce a reversed output like that shown in FIG. 5. In FIG. 5, a curve 16', which is similar to curve 16 of FIG. 3, is shown changing from a negative on the left of FIG. 5 through the 0 cross-over point 18' to a positive on the right side of FIG. 5. When this happens, solenoid 136 of FIG. 6 will sense a negative signal as soon as the apparatus starts operating and will stop the lenses 200 and 201 in the infinity position. While this is an undesirable effect in general, the operation is not as bad as it may seem since the problem does not often occur and when it does, the lens will be in an infinity position and the system will operate much like a box camera with most of the pictures being satisfactory anyway. To further improve the situation, the mechanism of FIG. 7 may be slightly altered so that the first stop member 206, rather than being at the exact position for focus at infinity, may be placed to cause lens 201 to occupy the hyperfocal position and thus have a greater range of satisfactory focus for remote objects. Since the hyperfocal position varies with the f-stop of the taking lens, stop 206 can be movably positioned on member 205 by a connection between stop member 206 and the f-stop mechanism of the camera. Thus, when the situation described in connection with FIG. 5 occurs, solenoid 136 and plunger 282 would operate to stop the lens 201 at the hyperfocal position for all f-stops. Also, since in FIG. 5 the reversed output curve 16' appears to cross the zero axis at point 18' which is at the correct focus position, a zero cross-over sensor circuit may be employed so that plunger 282 is activated whenever zero cross-over occurs whether from the positive to negative or from the negative to positive. In this latter case, proper focus would occur in both situations. Alternately, in order to reduce the chances of a reverse output signal occurring, two separate systems each being like that shown in FIG. 6 may be employed with two sets of four detectors positioned on circuit chip 260 of FIG. 7 and with an additional two lenslets similar to lenslets 260 and 262 placed in front of them. When two such systems are employed, the signals from the output amplifiers of the systems may be summed in a circuit like that shown in FIG. 8 wherein the output amplifier 132 of FIG. 6 is shown and an additional output amplifier 132' representing the output of the additional circuit is shown. The outputs of these two amplifiers appearing on lines 134 and 134' respectively are presented through two resistors 400 and 401 respectively to a junction point 402 which is shown connected by a line 405 to a summing amplifier 407 having an output on a line 410. Amplifier 407 may be an operational amplifier having its output connected to its input by a resistor 412 so that the amplifier acts as a summing circuit. The summed output on line 410 will then be presented to the solenoid 136 in FIG. 6 and the operation will be the same as has been described in connection with the previous figures. By summing two separate circuits in the manner described in connection with FIG. 8, the chances of having one of the detectors fall exactly at the peak of a distribution pattern in both cases, would be considerably less than is the case with merely using four detectors.

It is therefore seen that I have provided a simplified and low cost auto focus system which may be utilized in inexpensive cameras. Many obvious alterations will occur to those skilled in the art and I do not wish to be limited to the specific disclosures used in connection with the preferred embodiment. I intend only to be limited by the following claims.

The embodiments of the invention in which an exclusive property or right is claimed are defined as follows:

1. Range determination apparatus for use with an optical system including first lens means movable along a first axis to a first position in which an image of a remote object is in proper focus at a predetermined plane comprising:
    second lens means coupled to the first lens means so as to move therewith along a second axis parallel to and displaced from the first axis and operable to transmit radiation from the object;
    third lens means mounted to receive the radiation transmitted by the second lens means so as to form first and second images of the exit pupil of the second lens means;
    first and second radiation detector means mounted to receive the first image of the exit pupil of the second lens means, the first and second radiation detector means each being operable to produce an output signal indicative of the radiation received thereby, the output signals of the first and second radiation detector means being substantially equal when the first lens means is proximate the first position and normally being unequal when the first lens means is on either side of the first position;
    third and fourth radiation detector means mounted to receive the second image of the exit pupil of the second lens means, the third and fourth radiation detector means each being operable to produce an output signal indicative of the radiation received thereby, the output signals of the third and fourth radiation detector means being substantially equal when the first lens means is proximate the first position and normally being unequal when the first lens means is on either side of the first position; and signal receiving means connected to the first, second, third and fourth radiation detector means to receive the output signals therefrom and produce a resultant output signal indicative of whether the first lens means should be moved in order to occupy the first position.

2. Apparatus according to claim 1 wherein the signal receiving means includes log means to convert the output signals of the first, second, third and fourth detector means to first, second, third and fourth log signals respectively so as to compensate for changes in the intensity of radiation from the object.

3. Apparatus according to claim 2 wherein the resultant output signal from the signal receiving means is indicative of the value of the difference between the the first signal less the fourth signal and the the second signal less the the third signal.

4. Apparatus according to claim 1 further including motive means connected to the signal receiving means to receive the resultant output signal and operable to drive the first lens means toward the first position.

5. Apparatus according to claim 4 wherein the motive means includes a first member connected to move the first and second lens means and having a cam follower mounted thereon;

movable cam means having a first surface cooperating with the cam follower, motion of the cam means normally causing motion of the first member; and stop means mounted proximate the first member and connected to receive the resultant output signal, said stop means operable in accordance with the resultant signal to stop the first member when the first lens means is proximate the first position.

6. Apparatus according to claim 5 wherein the first member is normally positioned so that the first lens means produces a focused image of an object at infinity at the predetermined plane, wherein upon motion of the cam means the first lens means is moved by the first member in a direction to focus images of objects progressively closer than infinity at the predetermined plane and wherein when the resultant output signal is indicative of the first lens means being at the first position, the stop means prevents further motion of the first member.

7. Apparatus according to claim 6 wherein the range determination apparatus is associated with a camera having a shutter mechanism and wherein the first lens means is the taking lens of the camera and the predetermined plane is the film plane the apparatus further including shutter mechanism operating means operable by the cam means after the taking lens is at the first position.

8. Apparatus according to claim 1 wherein the coupling between the second lens means and the first lens means includes proportion means operable to cause a different amount of movement of the second lens means than the first lens means.

9. Apparatus according to claim 8 wherein the focal length of the first and second lens means is different by the same proportion as the difference in the amounts of movement thereof.

10. Automatic focussing apparatus for use with a camera having a film plane and taking lens movable along a first axis and operable to direct radiation from a scene containing an object to be focused upon to the film plane, comprising:

focus lens means including at least a portion movable with the taking lens means along a second axis parallel to but displaced from the first axis and operable to produce first and second radiation patterns of the scene, the patterns being similar and in a relative first condition when the taking lens means is in a first position to focus an image of the object properly at the film plane, in a relative second condition when the taking lens means is on a first side of the first position and in a relative third condition when the taking lens means is on a second side of the first position;

a first radiation detector positioned to receive radiation corresponding to a first position in the first pattern and to produce a first signal in accordance therewith;

a second radiation detector positioned to receive radiation corresponding to a second position in the first pattern and to produce a second signal in accordance therewith;

a third radiation detector positioned to receive radiation corresponding to a first position in the second pattern and to produce a third signal in accordance therewith;

a fourth radiation detector positioned to receive radiation corresponding to a second position in the second pattern and to produce a fourth signal in accordance therewith; and signal receiving means connected to said first, second, third and fourth detectors to receive the first, second, third and fourth signals respectively and to produce a resultant signal representative of the absolute value of the difference between the log of the first signal and the log of the fourth signal less the absolute value of the difference between the log of the second signal and the log of the third signal, the resultant signal having a first characteristic when the patterns are in the relative second condition and having a second characteristic when the patterns are in the relative third condition, as an indication that the taking lens means is on the first or second side respectively of the first position.

11. Apparatus according to claim 10 wherein the first, second, third and fourth radiation detectors are photo diodes.

12. Apparatus according to claim 10 further including motive means connected to the signal receiving means to receive the resultant signal and operable in accordance therewith to move the taking lens toward the first position.

13. Apparatus according to claim 12 wherein the camera includes a picture taking actuation mechanism and wherein the motive means includes:

an actuation member connected to receive the resultant signal and being in a first state when the resultant signal has the first characteristic and being in a second state when the resultant signal has the second characteristic;

a first member connected to the taking lens means and the focus lens means so that motion of the first member is accompanied by motion of the taking lens means and the focus lens means;

a second member connected to the picture taking actuation mechanism and movable therewith, the second member normally connected in driving relation to the first member so that motion of the picture taking actuation mechanism is normally accompanied by motion of the first member;

means connected to the actuation member and the first member to stop motion of the first member when the actuation member is in the second state and further motion of the second member is not accompanied by motion of the first member.

14. Apparatus according to claim 13 wherein the camera includes a shutter actuation mechanism and wherein the second member cooperates with the shutter actuation mechanism after motion of the first member has stopped.

15. Range determination apparatus for use with an optical system including lens means operable to transmit radiation from a remote object movable to a first position in which an image of the object is in proper focus at a predetermined plane comprising:

means receiving radiation transmitted by the lens means and operable to form first and second images of at least a portion of the exit pupil of the lens means;

first, second, third and fourth radiation detector means, each operable to produce an output signal which is a log function of the radiation received thereby;

means mounting the first and second radiation detector means to receive the first image of the exit pupil of the lens means;

means mounting the third and fourth radiation detector means to receive the second image of the exit pupil of the lens means; and signal receiving means connected to the first, second, third and fourth detector means to receive the output signals therefrom and to produce a resultant output signal indicative of whether the lens means should be moved in order to occupy the first position.

16. Apparatus according to claim 15 wherein the signal receiving means comprises:

difference means operable to produce a first signal indicative of the difference between the output signals of the first and the fourth detector means and a second signal indicative of the difference between the output signals of the second and third detector means; and comparator means connected to the difference means to receive the first and second signals and produce the resultant output signal indicative of the difference between the first and second signals.

17. Apparatus according to claim 16 wherein the difference means includes absolute value means operable to cause the first and second signals to represent absolute values.

18. Apparatus according to claim 15 further including motive means connected to the signal receiving means to receive the resultant output signal and connected to move the lens means toward the first position in accordance with the resultant output signal.

19. Automatic focusing apparatus for use with a camera having a film plane and first lens means moveable along a first axis and operable in a focus position to direct a focused image of a remote object to the film plane, comprising:

second lens means including focus lens means connected to and moveable in a predetermined ratio with the first lens means along a second axis substantially parallel to but displaced from the first axis and operable to transmit radiation from the remote object;

detector means mounted to receive radiation transmitted by said focus lens means and to produce an output signal which has a first characteristic when the first lens means is on one side of the focus position, a second characteristic when the first lens means is on the other side of the focus position and a reference characteristic when the first lens means is proximate the focus position;

motive means operable to move the first and second lens means along the first and second axes respectively; and signal receiving means connected to said motive means and to said detector means to receive the output signal, said signal receiving means being responsive to the reference characteristic to cause said motive means to stop the motion of the first and second lens means.

20. Apparatus according to claim 19 wherein said second lens means includes lenslet means to transmit an image of the exit pupil of the focus lens means to the detector means.

21. Apparatus according to claim 20 wherein the output signal is a function of the logarithm of the radiation received by said detector means.

22. Apparatus according to claim 21 wherein the reference characteristic is a reference voltage, the first characteristic is a value on one side of the reference voltage and the second characteristic is a value on the other side of the reference voltage.

23. Apparatus according to claim 22 wherein the reference voltage is zero.

24. Apparatus according to claim 19 wherein said motive means includes a first member connected to said focus lens means and being moveable by the operator of the camera and wherein said signal receiving means includes a motive member moveable upon the occurrence of the reference characteristic to engage the first member to prevent further motion thereof.

25. Apparatus according to claim 24 wherein the first member includes a plurality of stops and wherein the motive member is a solenoid having a plunger operable to engage one of the stops.

* * * * *